Patented June 26, 1934

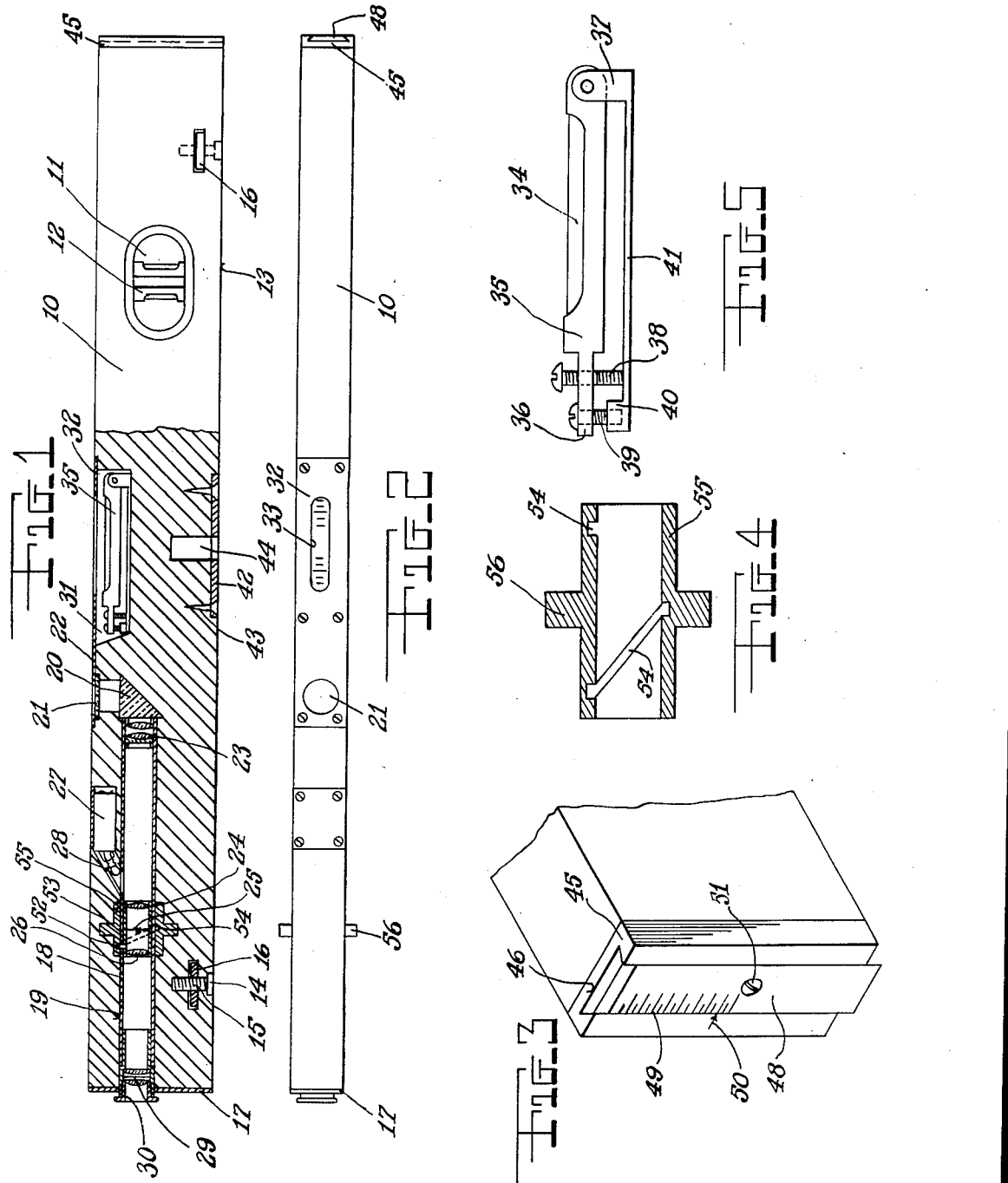

1,964,408

UNITED STATES PATENT OFFICE 1,964,408

TRANSIT LEVEL

Howard O. Stouffer, Annville, and Ernest J. Carlson, Reading, Pa.

Application February 11, 1932, Serial No. 592,238

1 Claim. (Cl. 88—2.2)

The main object of this invention is to provide a level equipped with air bubbles for plumbing a vertical or a horizontal line or plane, and also to provide the same with a telescope which permits line sighting in a horizontal plane with the level.

Another object of the invention is to provide a level having a telescope capable of magnification, for sighting a point in a horizontal or angularly inclined plane at a distance from the level, or sighting a target or other object.

Still another object is to provide a level with a telescope and means for setting up the level in angular position so that inclines and decline may be sighted.

A further object is to provide means whereby the level may be placed upon a transit tripod to be used as a transit.

The above and other objects will become apparent in the description below, in which characters of reference refer to like-named parts in the drawing.

Referring briefly to the drawing, Fig. 1 is a partly sectioned longitudinal elevational view of the level, showing in section that portion of the level housing the telescope and bubble.

Figure 2 is a top plan view of the level.

Figure 3 is a perspective view of one end of the level, showing the means used for inclining the level to any desired angle.

Figure 4 is a longitudinal, sectional, elevational view through the lens focusing sleeve.

Figure 5 is a front elevational view of the horizontal bubbles per se, showing the means for adjusting the same.

Referring in detail to the drawing, the numeral 10 indicates a substantially rectangular longitudinal beam which may be of any desired material, as wood, for example, or which may be moulded from any desired metal into any desired shape. This leveling beam has an opening 11 near one end, in which vertical bubbles 12 are provided. The plumbing face 13 of the beam is provided near opposite ends with adjustable shim blocks 14. These blocks are provided with threaded studs 15. upon which are engaged thumb nuts 16, and they are adapted to mount the level beam in a truly horizontal plane when the surface on which the beam is placed is not truly horizontal. A plate guard 17 is mounted on one end of the beam 10 and serves to preserve the outline of the end of the beam. This guard has an opening through which is inserted a telescope body 18 consisting of a cylindrical tube, this tube entering a similarly-formed bore 19 formed in member 10. The latter has a chamber therein at the internal end of the bore 19 into which a prism 20 is fitted. Above one face of the prism an eye glass 21 is fitted into the recess in the surface of member 10 and is secured in place by a guard plate 22. In the telescope body 18, adjacent the right-angled face of the prism 20, a series of magnifying lenses 23 are rigidly mounted. The telescope body 18 has a tube 24 longitudinally and non-rotatably movable therein, in which cross-wires 25 are located. The cross-wires are at all times positioned on the focal plane of the lens system. At both ends of the tube, variable lenses of crown and flint glass are secured, and are movable with the tube. A pin 52 is anchored to the tube 24 and is movable in a slot 53 formed in the telescope body 18. This pin projects into the helical channel 54 of a mover sleeve 55 rotatably mounted in an opening in member 10 on the body 18. The sleeve 55 is provided with an annular collar having a preferably knurled periphery which projects from both sides of the beam 10. This beam may be of skeleton (webbed and ribbed) or of solid construction.

An opening is formed in the body of the telescope of the device adjacent the tube 24. This opening communicates with a channel in the beam 10, which extends angularly to the surface of the beam and then projects parallel to said surface. This channel houses a dry cell 27 which has a filament lamp 28 connected in circuit therewith. This lamp, when illuminated, throws a beam of light upon the cross-wires 26, and this illumination aids the user of the device in finding the target, and introduces light generally into the telescope system. The outer end of the telescope body is provided with an objective series of lenses 29 fitted into a slidable barrel 30, and the lenses may be adjusted to obtain the magnification desired. Intermediate the length of the beam 10, a chamber 31 is formed and is covered by a plate 32 having a sighting slot 33 therein. In this chamber a bubble 34 and a bubble-adjusting mechanism are located. The bubble is encased in a cylindrical member 35 having an ear 36 projecting from one end. The opposite end of member 35 is pivotally secured between a pair of hinge lugs 37. The ear 36 is provided with a threaded hole in which a screw 38 is located. Adjacent this screw, a second screw 39 passes through a clearance hole in the ear 36 and threadably engages a block 40 formed on the extreme end of a platform 41. These two screws are provided to permit adjustment of the bubble when setting the level. On the opposite side of the beam, a plate 42 is secured by screws 43. This plate has an opening therein communicating with a bore 44 in the level beam, and enables the entire level beam to be mounted upon a transit tripod or similar device when the level is to be used as a transit. At one end of the level beam, an apron 45 is located and has a dovetailed channel 46 in which a slide 48 registers. The slide is provided with desired graduations 49, and the apron itself has an index graduation 50 cooperating with the said graduations. The slide is also provided with a threaded locking screw 51 which engages the surface of the channel 46 and permits the slide 48 to be located in any desired position by the manipulation of a screw driver or other tool.

The bubbles in chamber 31 are adapted to plumb a horizontal plane, and the bubbles 12 a vertical plane. The level may also be employed as a sighting transit by placing the eye over the peep hole covered by the eye glass 21. Sighting through this peep hole, an image in front of the objective lenses 29 (which image may be sighted on a target) shows a horizontal plane, as the rays are refracted at a ninety-degree angle by the prism 20. The magnification of the lens system may be varied by shifting the variable lenses longitudinally in the telescope body. The position of the focal plane varies according to magnification and is therefore carried in the movable tube 24 between the variable lenses. When it is desired to place the beam 10 in accurately horizontal position on an irregular or inclined surface, the blocks 14 are utilized to align the level beam in truly horizontal position. This adjustment is made by rotating the thumb screws 16. Should an angle of declination of the plumbing beam be desired, the slide 48 (movable in channel 46 of the apron 45) is adjusted to the desired angle which is indicated by the graduations 49 on the slide.

It is to be noted that changes in form and structure may be made without departing from the spirit of the invention. For instance, any kind or type of lens which serves the desired purpose, may be used.

We claim:

In a device of the class described having a telescope body imbedded in a beam, a tube slidably mounted within said body and having lenses therein, said body having a longitudinal slot therein, said tube having a rigid pin thereon passing through said slot, a hollow sleeve rotatably mounted in said beam surrounding said body, the inner surface of said sleeve having a helical groove therein, said pin projecting into said groove, said sleeve having an annular knurled collar rigid and concentric therewith of greater diameter than the width of said beam.

HOWARD O. STOUFFER.
ERNEST J. CARLSON.